(12) United States Patent
Han (10) Patent No.: US 7,248,307 B2
(45) Date of Patent: Jul. 24, 2007

(54) LIQUID CRYSTAL DISPLAY MODULE HAVING DIFFERENT NUMBERS OF SECURING POINTS TO SECURE OPTICAL SHEET TO SUPPORT

(75) Inventor: Sang Yub Han, Kyoungaangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 15 days.

(21) Appl. No.: 10/748,386

(22) Filed: Dec. 29, 2003

(65) Prior Publication Data

US 2004/0183957 A1    Sep. 23, 2004

(30) Foreign Application Priority Data

Mar. 17, 2003  (KR)  ...................... 10-2003-0016458

(51) Int. Cl.
*G02F 1/1333* (2006.01)
(52) U.S. Cl. .................. 349/58; 349/60; 349/64; 349/114
(58) Field of Classification Search ............. 349/58–60
See application file for complete search history.

(56) References Cited

U.S. PATENT DOCUMENTS 5,309,264 A * 5/1994 Lien et al. ................. 349/143
5,745,206 A * 4/1998 Koike et al. ................ 349/129
6,005,650 A * 12/1999 Kim et al. .................. 349/130
6,008,871 A * 12/1999 Okumura .................... 349/61
6,175,396 B1 * 1/2001 Kim et al. .................. 349/58
6,392,724 B2 * 5/2002 An et al. .................... 349/58
6,552,761 B1 * 4/2003 Seo et al. ................... 349/58
6,580,477 B1 * 6/2003 Cho ........................... 349/65
6,661,482 B2 * 12/2003 Hara .......................... 349/96
6,847,417 B2 * 1/2005 Kim .......................... 349/58

FOREIGN PATENT DOCUMENTS

JP   2001-76527   3/2001

OTHER PUBLICATIONS

Office Action dated Dec. 15, 2004 for Korean Patent Application No. 2003-0016458 (no translation).

* cited by examiner

*Primary Examiner*—Andrew Schechter
(74) *Attorney, Agent, or Firm*—Brinks Hofer Gilson & Lione (57) ABSTRACT

A liquid crystal display module is disclosed that has an optical sheet supported by a main support. In the module, the optical sheet is secured to a main support through a first securing point close to one corner at one side and secured to the main support through a second securing point close to each corner at the opposing side. In this liquid crystal display module, deformations in the optical sheet caused by applied heat from the light source is reduced or eliminated.

10 Claims, 8 Drawing Sheets

LIQUID CRYSTAL DISPLAY MODULE HAVING DIFFERENT NUMBERS OF SECURING POINTS TO SECURE OPTICAL SHEET TO SUPPORT

The present invention claims the benefit of Korean Patent Application No. 2003-16458 filed in Korea on Mar. 17, 2003, which is hereby incorporated by reference for all purposes as if fully set forth herein.

BACKGROUND OF THE INVENTION

1. Field of the Invention

This invention relates to a liquid crystal display module, and more particularly to a liquid crystal display module that has a heat resistant structure.

2. Description of the Related Art

Generally, a liquid crystal display (LCD) includes a liquid crystal display module, driving circuitry for driving the liquid crystal display module, and a case.

The liquid crystal display module consists of a liquid crystal display panel having liquid crystal cells arranged in a matrix between two glass substrates, and a backlight unit for irradiating light onto the liquid crystal display panel. The liquid crystal display module is arranged with optical sheets for directing light vertically from the backlight unit toward the liquid crystal display panel.

In such liquid crystal display panel, the backlight unit and the optical sheets must be engaged with each other in an integral shape so as to prevent light loss, and protected from damage caused by an external impact. To this end, there are provided a case for the LCD enclosing the back light unit and the optical sheets including the edge of the liquid crystal display panel.

Figure 1:
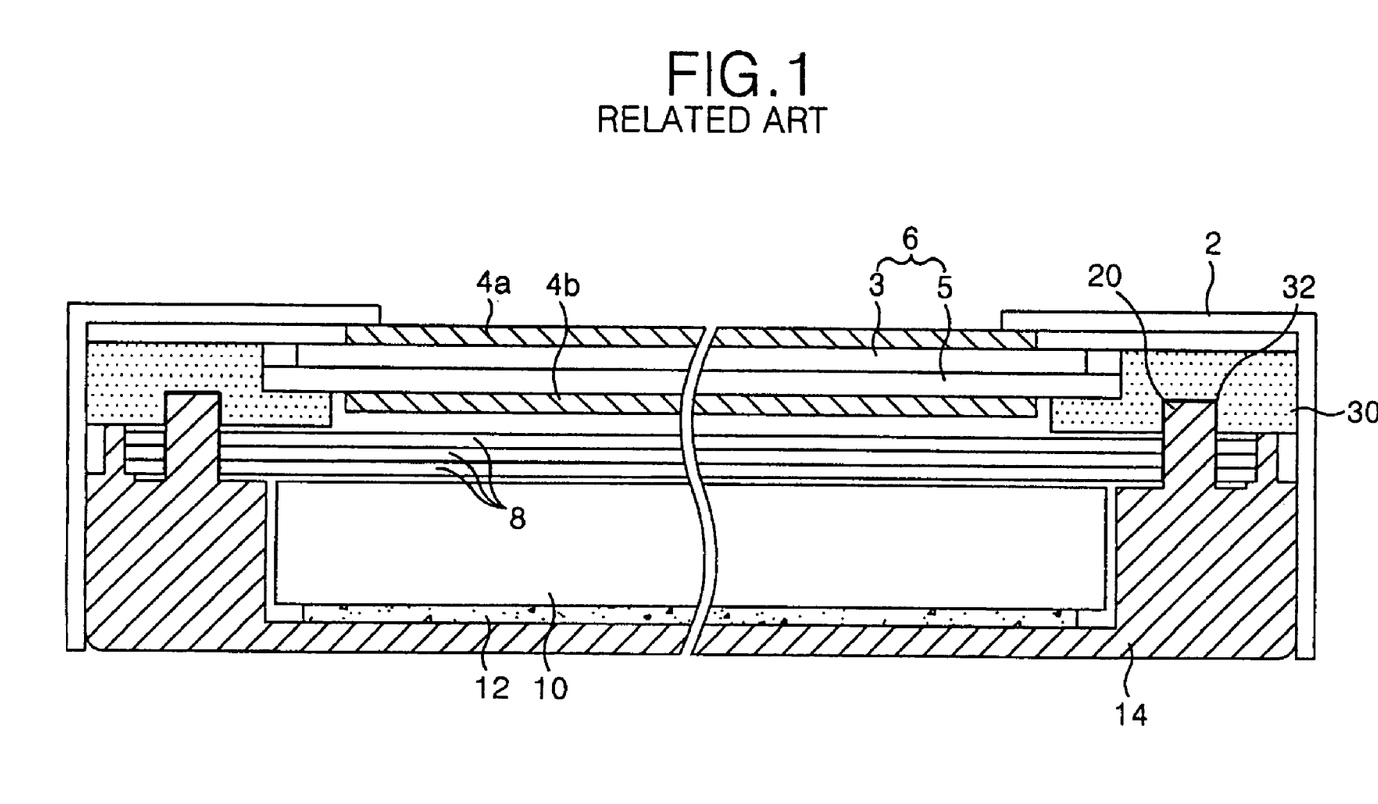
FIG. 1 is a schematic section view showing a structure of a conventional liquid crystal display module.

Referring to FIG. 1, the conventional liquid crystal display module includes a main support 14, a backlight unit and a liquid crystal display panel 6 disposed at the inside of the main support 14, a guide panel 30 arranged on the main support 14 to support the liquid crystal display panel 6 and secure optical sheets 8 of the backlight unit, and a case top 2 for enclosing the edge of the liquid crystal display panel 6 and the side surface of the main support 14.

The liquid crystal display panel 6 is comprised of an upper substrate 3 and a lower substrate 5. A liquid crystal is injected between the upper substrate 3 and the lower substrate 5, and the liquid crystal display panel 6 is provided with a spacer (not shown) for constantly keeping a gap between the upper substrate 3 and the lower substrate 5. The upper substrate 3 of the liquid crystal display panel 6 is provided with a color filter, a common electrode and a black matrix, etc. Signal wiring such as data line and a gate line, etc. (not shown) is formed at the lower substrate 5 of the liquid crystal display panel 6, and a thin film transistor (TFT) is formed at an intersection between the data line and the gate line. The TFT switches a data signal to be transmitted from the data line into the liquid crystal cell in response to a scanning pulse (i.e., a gate pulse) from the gate line. A pixel electrode is formed at a pixel area between the data line and the gate line. One side of the liquid crystal display panel 6 is provided with data and gate pad areas connected to the data lines and the gate lines, respectively. A data tape carrier package mounted with a data driver integrated circuit (not shown) for applying a data signal to the data lines is attached onto the data pad area. Further, a gate tape carrier package mounted with a gate driver integrated circuit (not shown) for applying a scanning pulse (i.e., a gate pulse) to the gate lines is attached onto the gate pad area.

An upper polarizing sheet 4a is attached onto the upper substrate 3 of the liquid crystal display panel 6 while a lower polarizing sheet 4b is attached onto of the rear side of the lower substrate 5 of the liquid crystal display panel 6.

The main support 14 is the product of a mold, the inner sidewall surface of which is molded into a stepped coverage face. The inner bottom layer of the main support 14 is mounted with a backlight unit including a reflective sheet 12, a light guide plate 10, a plurality of optical sheets 8 and a lamp housing (not shown). The upper surface of the main support 14 is provided with a protrusion protruded perpendicularly.

The backlight unit includes a lamp 22, a lamp housing (not shown) for enclosing the lamp, a light guide plate 10 for progressing a light inputted from the lamp 22 into the liquid crystal display panel 6, a reflective sheet 12 arranged at the rear side of the light guide plate 10, and a plurality of optical sheets 8 disposed on the light guide plate 10.

Light generated from the lamp 22 is incident, via an incidence face of the light guide plate 10, into the light guide plate 10. The lamp housing reflects light from the lamp 22 into an incidence face of the light guide plate 10.

The reflective sheet 12 reflects light incident thereto through the rear side of the light guide plate 10 into the light guide plate 10, thereby reducing light loss. In other words, if light from the lamp 22 is incident to the light guide plate 10, then light having progressed into the lower surface and the side surface of the light guide plate 10 is reflected by the reflective sheet 12 to thereby be redirected toward the front side thereof.

The plurality of optical sheets 8 vertically raise light outputted from the light guide plate 10 to thereby improve the light efficiency. To this end, diffusing sheets are provided for diffusing light outputted from the light guide plate 10 into the entire area, and two prism sheets for redirecting the angle of the light diffused by the diffusing sheets vertically with respect to the liquid crystal display panel 6. Thus, light outputted from the light guide plate 10 is incident, via the diffusing sheets and then the plurality of optical sheets 8, to the liquid crystal display panel 6.

Figure 2:
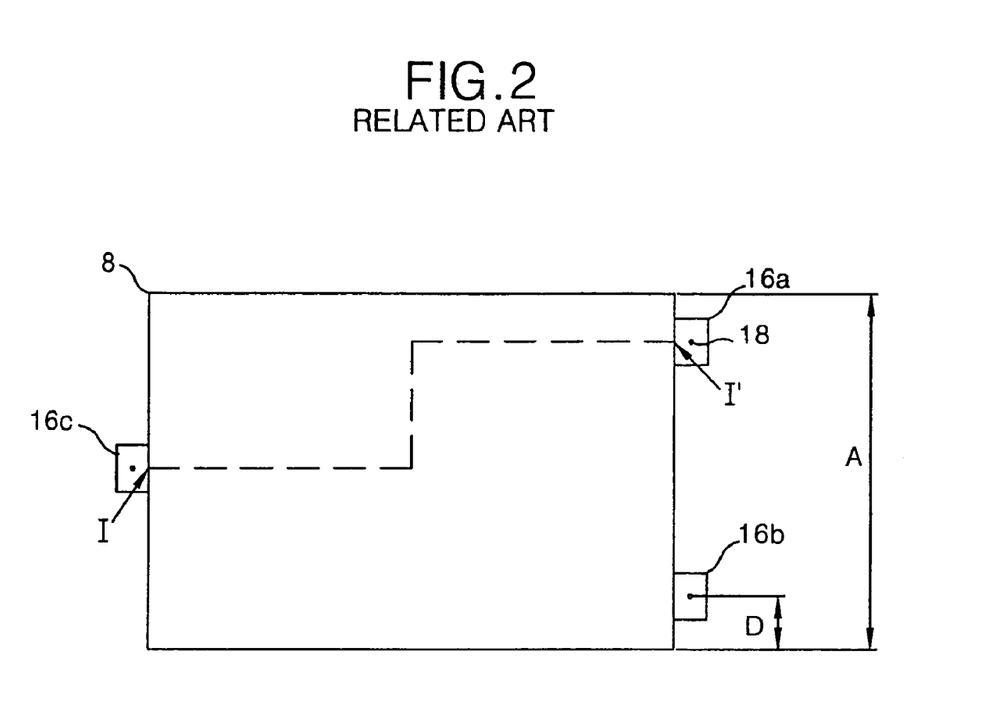
FIG. 2 is a plan view of the optical sheet shown in FIG. 1.
Figure 3:
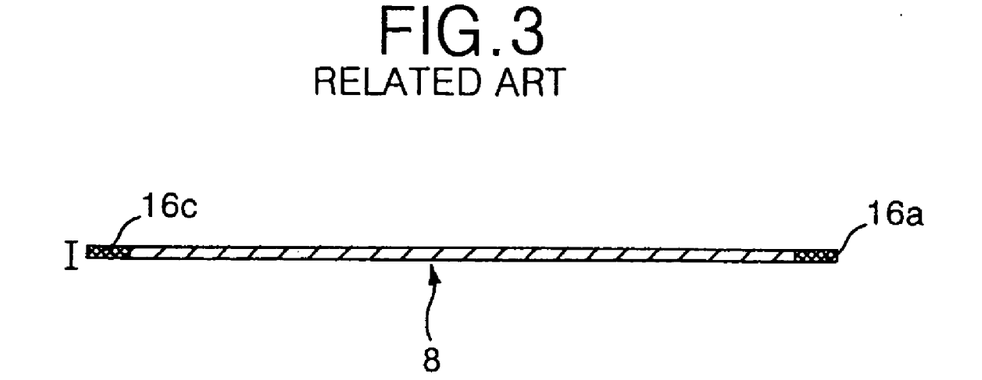
FIG. 3 is a section view of the optical sheet taken along the I–I' line in FIG. 1.
Figure 4:
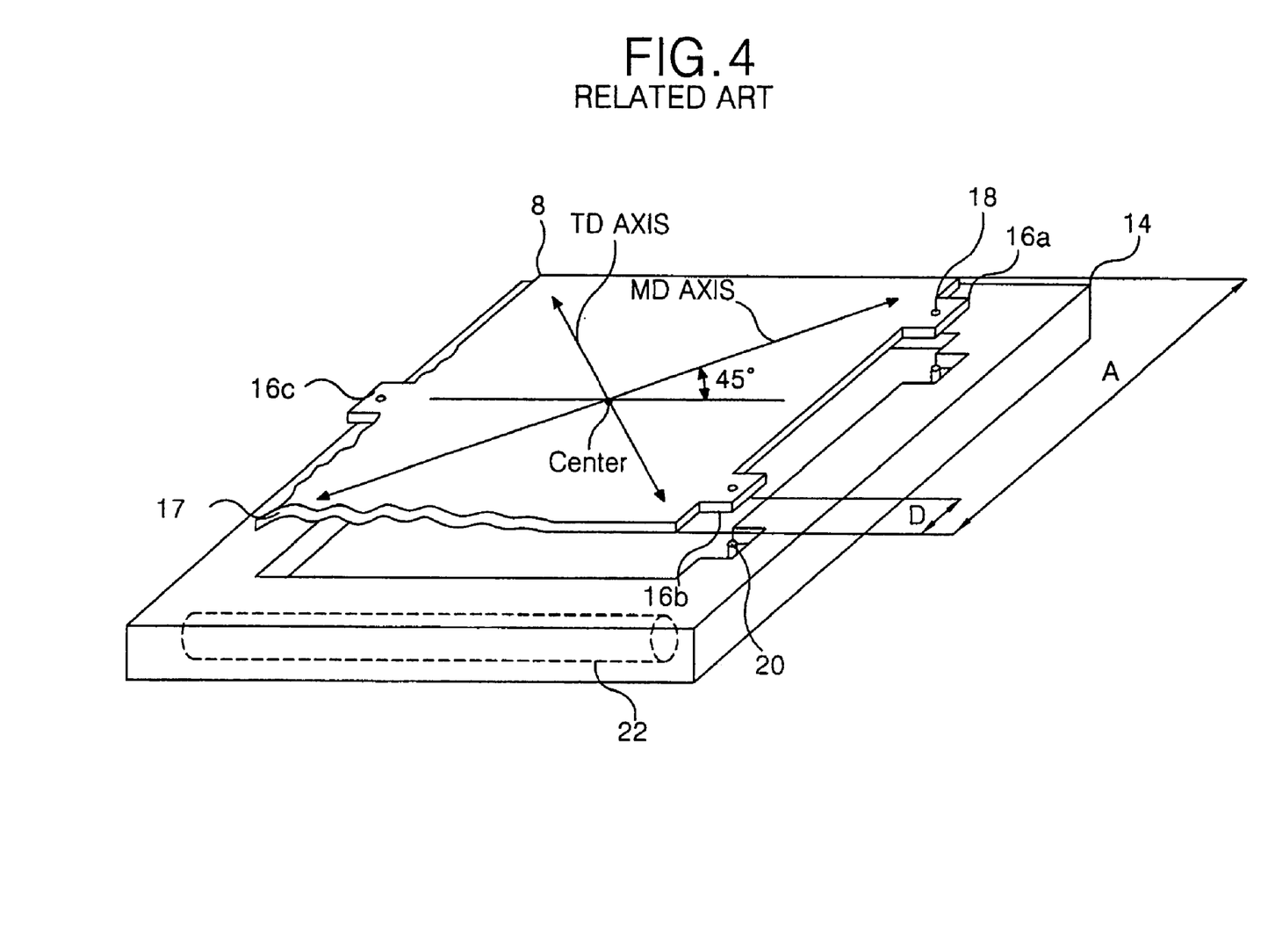
FIG. 4 is a perspective view of the optical sheet shown in FIG. 1.

As shown in FIG. 2 to FIG. 4, the optical sheets 8 are provided with ears 16a, 16b and 16c extending into each side surface thereof, each of which is provided with a hole 18. Each hole 18 of the ears 16a, 16b and 16c is inserted into the protrusion 20 of the main support 14. By such an assembly structure of the holes 18 and the protrusions 20, the optical sheets 8 are secured to the main support 14.

The guide panel 30 supports the liquid crystal display panel 6, and is fixed on the upper surface of the main support 14 to secure the optical sheets 8. To this end, the side surface of the guide panel 30 is provided with a securing part for securing the liquid crystal display panel 6, and the rear surface is provided with a protrusion hole 32 into which the protrusion 20 of the main support 14 is inserted.

The case top 2 is prepared into a square band shape having a plane part and a side part, each of which is bent perpendicularly. The case top 2 encloses the edge of the liquid crystal display panel 6 and the guide panel 30 engaged to the main support 14.

In an assembling method of the liquid crystal display module, the reflective sheet 12 and the light guide plate 10 are sequentially disposed on the main support 14. Then, the optical sheets 8 are inserted into the protrusion 20 of the main support 14. In other words, the holes 18 defined at the ears 16a, 16b and 16c of the optical sheets 8 are inserted into the protrusion 20 of the main support 14.

Subsequently, the guide panel 30 is engaged with the protrusion 20 of the main support 14 to which the optical sheets are secured. In other words, the protrusion hole 32 defined at the rear surface of the guide panel 30 is inserted into the protrusion 20 of the main support 14. Thus, the guide panel 30 is inserted into the protrusion 20 of the main support 14 to thereby pressurize and secure the optical sheets 8.

After the optical sheets 8 and the guide panel 30 are assembled to the main support 14, the liquid crystal display panel 6 is loaded onto the securing part of the guide panel 30. Then, as shown in FIG. 1, the case top 2 is assembled to enclose the edge of the liquid crystal display panel 6 secured to the guide panel 30, the side surface of the guide panel 30 and the side surface of the main support 14.

In order to secure the optical sheets 8, a pair of upper and lower ears 16a and 16b are defined at one side of the optical sheets 8, and one ear 16c is defined at the middle portion of a side opposed to the one side provided with the upper and lower ears 16a and 16b. Each ear 16a, 16b and 16c is provided with a hole 18 for engaging it to the protrusion 20 of the main support 14.

Each hole 18 defined at the ears 16a, 16b and 16c of the optical sheets 8 is inserted into the protrusion 20 of the main support 14 to be secured into the main support 14.

Consequently, the guide panel 30 is secured to the protrusion 20 of the main support 14 into which the optical sheets 8 have been inserted and secured. In other words, the protrusion hole 32 defined at the rear surface of the guide panel 30 is inserted into the protrusion 20 of the main support 14. Thus, the guide panel 30 is inserted into the protrusion 20 of the main support 14 to thereby pressurize and secure the optical sheets 8.

The optical sheets 8 of the liquid crystal display module are especially susceptible to heat from the lamp (which, although not shown, is disposed in the lower left hand corner of FIG. 4). The optical sheets 8 expand in two directions, a machine direction (MD) axis and a transverse direction (TD) axis, when heat is applied to them.

A thermal expansion coefficient in the MD axis of a general optical sheet is $3.8 \times 10^{-4}$ $Cm^2/°C$ while a thermal expansion coefficient in the TD axis thereof is $2.7 \times 10^{-4}$ $Cm^2/°C$. A ratio of a thermal expansion coefficient in the MD axis to a thermal expansion coefficient in the TD axis of such an optical sheet must be less than two to be relatively stable when heat is applied. Nevertheless, because of the disparity between the thermal expansion coefficients, a wrinkle 17 (i.e. deformation) occurs in the optical sheet to some extent when heat is applied.

Moreover, when a high light-convergence optical sheet such as a dual brightness enhancement film (DBEF) sheet is used, the thermal expansion coefficient of the optical sheet is increased due to an expansion process that occurs in the course of the assembling process. A thermal expansion coefficient in the MD axis of the DBEF sheet is $8.1 \times 10^{-5}$ $Cm^2/°C$ while a thermal expansion coefficient in the TD axis thereof is $1.5 \times 10^{-5}$ $Cm^2/°C$. As mentioned above, a ratio of a thermal expansion coefficient in the MD axis to that in the TD axis of the DBEF sheet is more than five. If heat is applied to such a DBEF film by the lamp, a wrinkle appears at the optical sheet 8. Particularly, since a middle portion of the optical sheet 8 that has a large difference between the thermal expansion coefficients is secured by means of the hole 16c and the protrusion 20, a sizeable wrinkle appears in the optical sheet 8.

SUMMARY OF THE INVENTION

Accordingly, embodiments of the present invention provide a liquid crystal display module that is less susceptible to heat and decreases or eliminates deformation caused by applied heat.

In one embodiment of the invention, a liquid crystal display module according to an embodiment of the present invention includes a main support and an optical sheet secured onto the main support. The optical sheet is secured to the main support through a first securing point close to one corner of a first side of the optical sheet and secured to the main support through a second and third securing points close to corners of a second side of the optical sheet opposing the first side of the optical sheet.

In the liquid crystal display module, the main support may include a plurality of protrusions, the protrusions disposed at the first, second and third securing points. In this case, the optical sheet may include a plurality of holes into which the protrusions are inserted and further the optical sheet may include a plurality of ears, the ears provided with the holes and protruding toward an outside of the optical sheet.

The liquid crystal display including the protrusions may further include a guide panel for securing the optical sheets at the upper portion thereof. In this case, the guide panel may include a hole into which the protrusion is inserted case.

The liquid crystal display module may further include a liquid crystal display panel supported by the main support and a light guide plate and a reflective sheet supported by the main support at the lower portion of the optical sheet.

The number of the securing points on the first side of the optical sheet may be different from the number of securing points on the second side of the optical sheet.

The optical sheet may have a partially different thermal expansion coefficient.

The optical sheet may include a dual brightness enhancement film (DBEF).

One or more of the securing points may be positioned at a region less than 1/10 of the entire length of the optical sheet.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE PREFERRED EMBODIMENT

Referring to FIG. 5 to FIG. 8, a liquid crystal display module according to an embodiment of the present invention includes a main support 114, a backlight unit and a liquid crystal display panel 106 disposed at the inside of the main support 114, a guide panel 130 arranged on the main support 114 to support the liquid crystal display panel 106 and secure optical sheets 108 of the backlight unit, and a case top 102 for enclosing the edge of the liquid crystal display panel 106 and the side surface of the main support 114.

Figure 5:
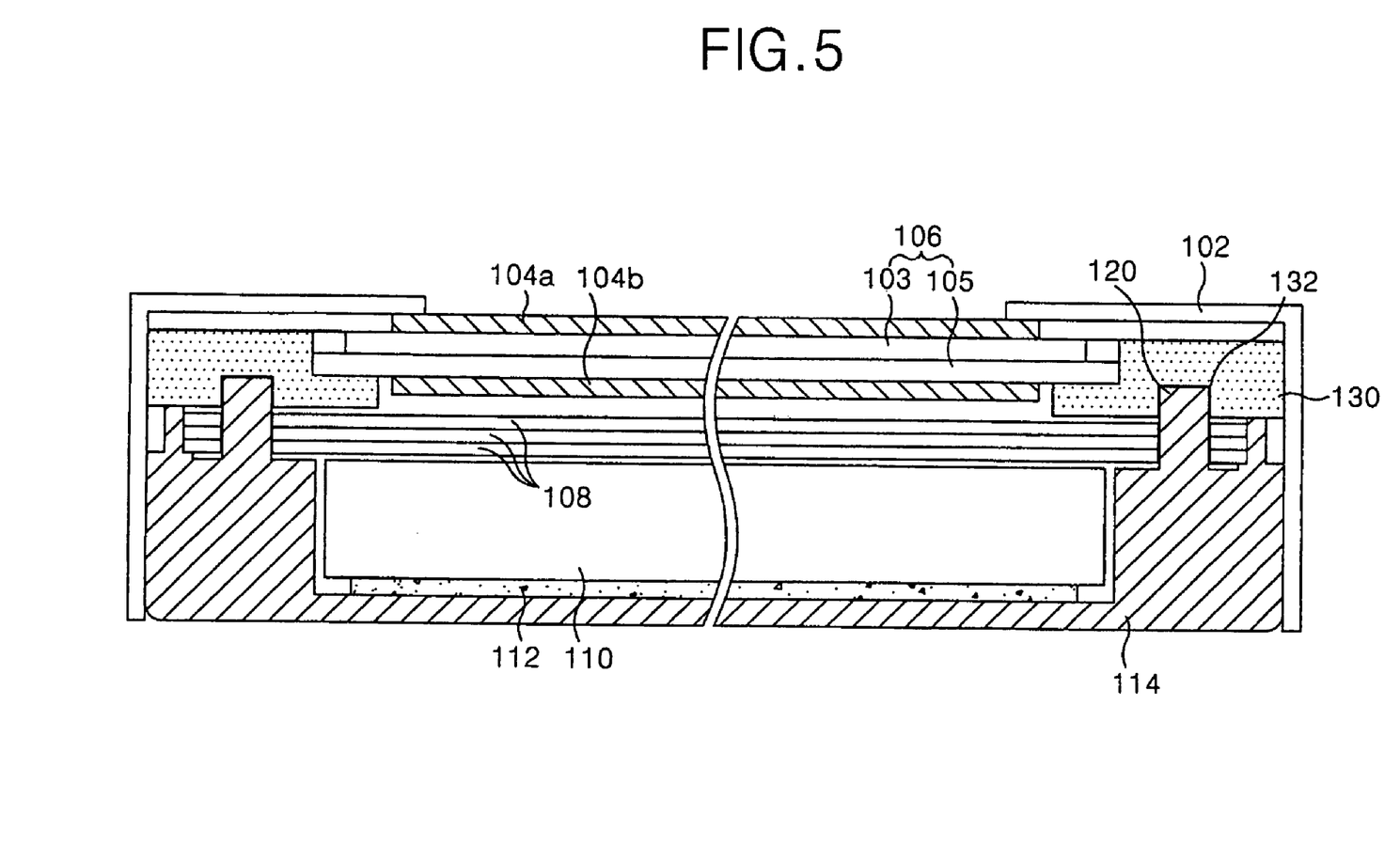
FIG. 5 is a schematic section view showing a structure of a liquid crystal display module according to an embodiment of the present invention.

The liquid crystal display panel 106 is comprised of an upper substrate 103 and a lower substrate 105. A liquid crystal is injected between the upper substrate 103 and the lower substrate 105, and the liquid crystal display panel 106 is provided with a spacer (not shown) for constantly keeping a gap between the upper substrate 103 and the lower substrate 105. The upper substrate 103 of the liquid crystal display panel 106 is provided with a color filter, a common electrode and a black matrix, etc. Signal wiring such as data line and a gate line, etc. (not shown) is formed at the lower substrate 105 of the liquid crystal display panel 106, and a thin film transistor (TFT) is formed at an intersection between the data line and the gate line. The TFT switches a data signal to be transmitted from the data line into the liquid crystal cell in response to a scanning pulse (i.e., a gate pulse) from the gate line. A pixel electrode is formed at a pixel area between the data line and the gate line. One side of the liquid crystal display panel 106 is provided with data and gate pad areas connected to the data lines and the gate lines, respectively. A data tape carrier package mounted with a data driver integrated circuit (not shown) for applying a data signal to the data lines is attached onto the data pad area. Further, a gate tape carrier package mounted with a gate driver integrated circuit (not shown) for applying a scanning pulse (i.e., a gate pulse) to the gate lines is attached onto the gate pad area.

An upper polarizing sheet 104a is attached onto the upper substrate 103 of the liquid crystal display panel 106 while a lower polarizing sheet 104b is attached onto the rear side of the lower substrate 105 of the liquid crystal display panel 106.

The main support 114 is a product formed from a mold, the inner sidewall surface of which is molded into a stepped coverage face. The inner bottom layer of the main support 114 is mounted with a backlight unit including a light guide plate 110 integral with a reflective sheet 112, a plurality of optical sheets 108 and a lamp housing (not shown). The upper surface of the main support 114 is provided with a perpendicular protrusion 120.

The backlight unit includes a lamp 122, a lamp housing (not shown) for enclosing the lamp, a light guide plate 110 for directing light inputted from the lamp into the liquid crystal display panel 106, a reflective sheet 112 arranged at the rear side of the light guide plate 110, and a plurality of optical sheets 108 disposed on the light guide plate 110.

Light generated from the lamp 122 is incident, via an incidence face of the light guide plate 110, into the light guide plate 110. The lamp housing reflects light from the lamp 122 into an incidence face of the light guide plate 110. The reflective sheet 112 re-reflects light incident thereto through the rear side of the light guide plate 110 into the light guide plate 110, thereby reducing light loss. In other words, if light from the lamp 122 is incident to the light guide plate 110, then light having progressed into the lower surface and the side surface of the light guide plate 110 is reflected by the reflective sheet 112 to thereby be reflected toward the front side thereof.

The plurality of optical sheets 108 vertically direct light outputted from the light guide plate 110 to thereby improve the light efficiency. To this end, diffusing sheets are provided for diffusing light outputted from the light guide plate 110 into the entire area, and two prism sheets for vertically directing the angle of the light diffused by the diffusing sheets with respect to the liquid crystal display panel 106. Thus, light outputted from the light guide plate 110 is incident, via the diffusing sheets and then the plurality of optical sheets 108, to the liquid crystal display panel 106.

Figure 6:
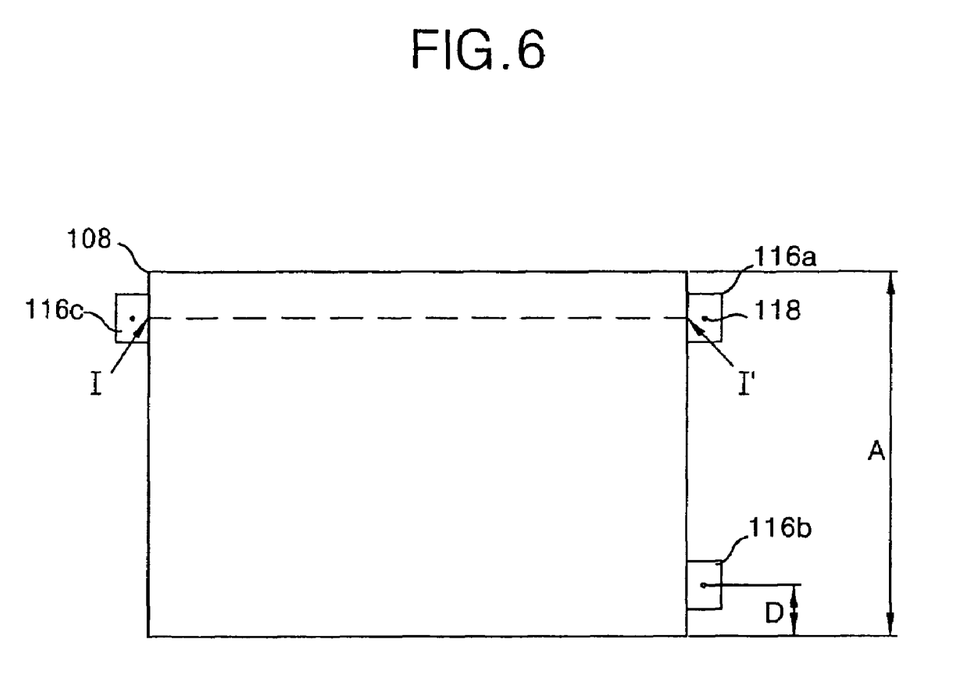
FIG. 6 is a plan view of the optical sheet shown in FIG. 5.
Figure 7:
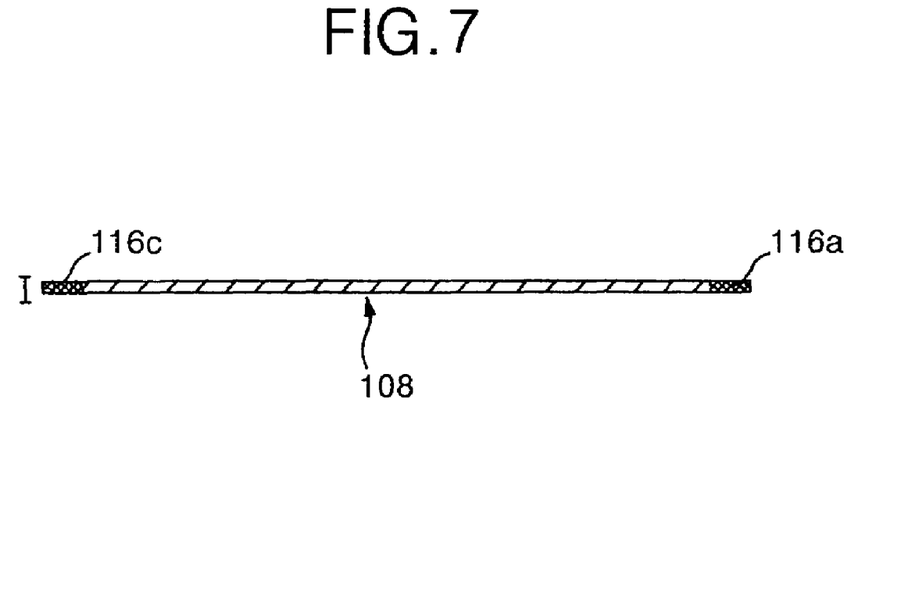
FIG. 7 is a section view of the optical sheet taken along the I–I' line in FIG. 5.
Figure 8:
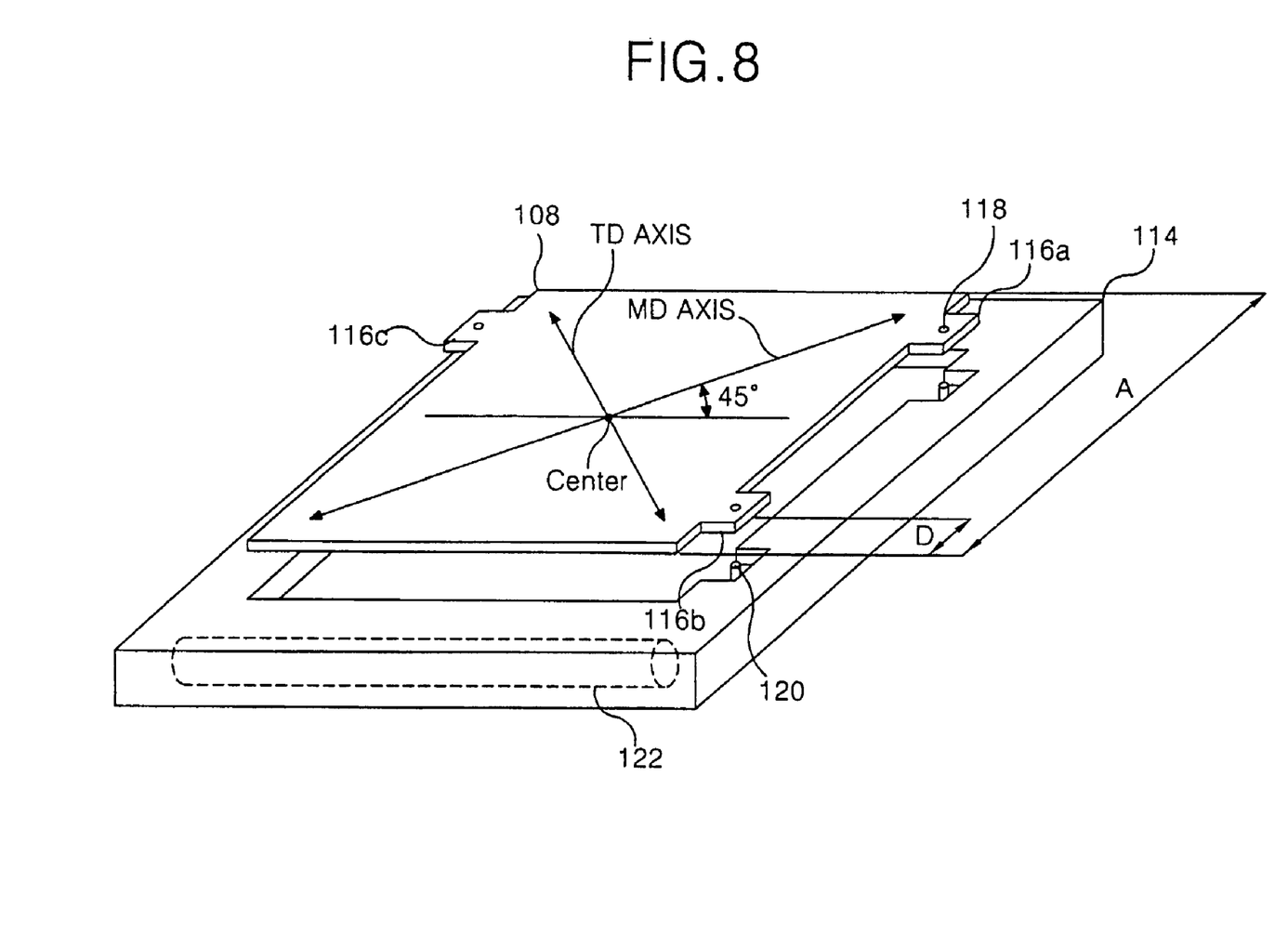
FIG. 8 is a perspective view of the optical sheet shown in FIG. 5.

As shown in FIG. 6 to FIG. 8, the optical sheets 8 are provided with ears 116a, 116b and 116c extending into each side surface thereof, each of which is provided with a hole 118. Each hole 118 of the ears 116a, 116b and 116c is inserted into the protrusion 120 of the main support 114. By such an assembly structure of the holes 118 and the protrusions 120, the optical sheets 108 are secured to the main support 114.

The guide panel 130 supports the liquid crystal display panel 106, and is fixed on the upper surface of the main support 114 to secure the optical sheets 108. To this end, the side surface of the guide panel 130 is provided with a securing part for securing the liquid crystal display panel 106, and the rear surface is provided with a protrusion hole 132 into which the protrusion 120 of the main support 114 is inserted.

The case top 102 is prepared into a square band shape having a plane part and a side part, each of which is bent perpendicularly. The case top 102 encloses the edge of the liquid crystal display panel 106 and the guide panel 130 engaged to the main support 114.

In an assembling method of the liquid crystal display module, the reflective sheet 112 and the light guide plate 110 are sequentially disposed on the main support 114. Then, the optical sheets 108 are inserted into the protrusion 120 of the main support 114. In other words, the holes 118 defined at the ears 116a, 116b and 116c of the optical sheets 108 are inserted into the protrusion 120 of the main support 114.

Subsequently, the guide panel 130 is engaged with the protrusion 120 of the main support 114 to which the optical sheets 108 are secured. In other words, the protrusion hole 132 defined at the rear surface of the guide panel 130 is inserted into the protrusion 120 of the main support 114. Thus, the guide panel 130 is inserted into the protrusion 120 of the main support 114 to thereby pressurize and secure the optical sheets 108.

After the optical sheets 108 and the guide panel 130 are assembled to the main support 114, the liquid crystal display panel 106 is loaded onto the securing part of the guide panel 130. Then, as shown in FIG. 5, the case top 102 is assembled to enclose the edge of the liquid crystal display panel 106 secured to the guide panel 130, the side surface of the guide panel 130 and the side surface of the main support 114.

As above, the optical sheets 108 in the liquid crystal display module expand in two directions: a machine direction (MD) axis and a transverse direction (TD) axis when heat is applied to the optical sheets 108.

A ratio of a thermal expansion coefficient in the MD axis to a thermal expansion coefficient in the TD axis of a general optical sheet is less than two.

However, when a high light-convergence optical sheet such as a dual brightness enhancement film (DBEF) sheet is used, a thermal expansion coefficient of the optical sheet is increased due to an expansion process in the course of the assembling process. Thus, a ratio of a thermal expansion coefficient in the MD axis to that in the TD axis of the DBEF sheet is more than five.

In the embodiment of the present invention, in order to secure the optical sheets 108, one side of the optical sheets 108 are provided with a pair of upper and lower ears 116a and 116b, and a side of the optical sheets 108 opposing the side provided with a pair of upper and lower ears 116a and 116b is provided with an ear 116a at the upper portion of a traverse direction (TD) axis. The thermal expansion coefficient in the traverse direction (TD) axis is smaller than in the machine direction (MD) axis.

Each ear 116a, 116b and 116c is provided with a hole 118 for engaging with the protrusion 120 of the main support 114. The hole 120 defined at each ear 116a, 116b and 116c of the optical sheets 108 is positioned at a region less than 1/10 of the entire length of the optical sheet 108 from the end of the optical sheet 108 as indicated in the following equation:

$$D \leq A/10 \qquad (1)$$

(wherein D represents a position of the hole and A represents entire length of the optical sheet)

The hole 118 defined at each ear 116a, 116b and 116c of the optical sheets 108 is inserted into the protrusion 120 of the main support 114 to thereby secure the optical sheets 108.

Subsequently, the guide panel 130 is secured to the protrusion 120 of the main support 114 into which the optical sheets 108 have been inserted and secured. In other words, a protrusion hole 132 defined at the rear surface of the guide panel 130 is inserted into the protrusion 120 of the main support 114. Thus, the guide panel 130 is inserted into the protrusion 120 of the main support 114 to thereby pressurize and secure the optical sheets 108.

As described above, a liquid crystal display module according to the present invention defines the ear 116c at the upper portion of the TD axis than the MD axis. This reduces or prevents a wrinkle caused by applied heat due to the difference in thermal expansion coefficients between the MD axis and the TD axis of the optical sheet.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display module, comprising:
a main support; and
an optical sheet secured to the main support through a first securing point close to one corner of a first diagonal line having a high thermal expansion coefficient of the optical sheet and secured to the main support through a second and third securing points close to corners of a second diagonal line having a low thermal expansion coefficient of the optical sheet,
wherein a number of securing points disposed so as to engage the first diagonal line is different from a number of securing points disposed so as to engage the second diagonal line.

2. The liquid crystal display module according to claim 1, wherein the main support includes a plurality of protrusions, the protrusions disposed at the first, second and third securing points.

3. The liquid crystal display module according to claim 2, wherein the optical sheet includes a plurality of holes into which the protrusions are inserted.

4. The liquid crystal display module according to claim 3, wherein the optical sheet includes a plurality of ears, the ears provided with the holes and protruding toward an outside of the optical sheet.

5. The liquid crystal display module according to claim 2, further comprising a guide panel for securing the optical sheets at an upper portion thereof.

6. The liquid crystal display module according to claim 5, wherein the guide panel includes a plurality of holes into which the protrusions are inserted.

7. The liquid crystal display module according to claim 1, further comprising:
a liquid crystal display panel supported by the main support; and
a light guide plate and a reflective sheet supported by the main support at a lower portion of the optical sheet.

8. The liquid crystal display module according to claim 1, wherein the optical sheet includes a dual brightness enhancement film (DBEF).

9. The liquid crystal display module according to claim 1, wherein the first securing point is disposed at a region less than 1/10 of an entire length of the optical sheet from the corners of the optical sheet.

10. The liquid crystal display module according to claim 1, wherein each of the first, second, and third securing points are disposed at a region less than 1/10 of an entire length of the optical sheet from the corners of the optical sheet.

* * * * *

UNITED STATES PATENT AND TRADEMARK OFFICE
CERTIFICATE OF CORRECTION

PATENT NO. : 7,248,307 B2 Page 1 of 1
APPLICATION NO. : 10/748386
DATED : July 24, 2007
INVENTOR(S) : Sang Yub Han

It is certified that error appears in the above-identified patent and that said Letters Patent is hereby corrected as shown below:

On the Title Page

Item (75), delete "Kyoungaangbuk-do" and substitute --Chilgok-gun-- in its place.

Signed and Sealed this

Fourth Day of December, 2007

JON W. DUDAS
*Director of the United States Patent and Trademark Office*